(12) United States Patent
Sanari (10) Patent No.: US 10,717,270 B2
(45) Date of Patent: Jul. 21, 2020

(54) METHOD FOR PRODUCING LIGHT-ACCUMULATING TRANSFER SHEET, LIGHT-ACCUMULATING TRANSFER SHEET AND TRANSFER METHOD FOR LIGHT-ACCUMULATING TRANSFER SHEET

(71) Applicant: SANTOSHOJI CO., LTD., Osaka (JP)

(72) Inventor: Katsuo Sanari, Osaka (JP)

(73) Assignee: SANTOSHOJI CO., LTD., Osaka (JP)

( * ) Notice: Subject to any disclaimer, the term of this patent is extended or adjusted under 35 U.S.C. 154(b) by 72 days.

(21) Appl. No.: 16/076,432

(22) PCT Filed: Mar. 6, 2017

(86) PCT No.: PCT/JP2017/008744
§ 371 (c)(1),
(2) Date: Aug. 8, 2018

(87) PCT Pub. No.: WO2017/195445
PCT Pub. Date: Nov. 16, 2017

(65) Prior Publication Data
US 2019/0039371 A1 Feb. 7, 2019

(30) Foreign Application Priority Data
May 10, 2016 (JP) .................. 2016-094501

(51) Int. Cl.
*B41J 2/005* (2006.01)
*B32B 27/00* (2006.01)
(Continued)

(52) U.S. Cl.
CPC ............ *B41J 2/0057* (2013.01); *B32B 27/00* (2013.01); *B32B 27/18* (2013.01); *B41M 5/025* (2013.01); *B44C 1/1733* (2013.01); *B44C 1/1737* (2013.01)

(58) Field of Classification Search
CPC ........ B41J 2/0057; B32B 27/00; B32B 27/18; B41M 5/025; B44C 1/1733; B44C 1/1737
See application file for complete search history.

(56) References Cited

U.S. PATENT DOCUMENTS

2003/0203146 A1 10/2003 Nakanishi
2008/0169747 A1 7/2008 Izumi
2017/0240807 A1 8/2017 Suzuki

FOREIGN PATENT DOCUMENTS

EP  1 090 974 A1  4/2001
JP  2000-282027 A  10/2000
(Continued)

OTHER PUBLICATIONS

International Search Report of PCT/JP2017/008744, dated May 9, 2017.

*Primary Examiner* — Lamson D Nguyen
(74) *Attorney, Agent, or Firm* — Collard & Roe, P.C.

(57) ABSTRACT

A method for producing a light-accumulating transfer sheet, which comprises: an adhesive layer forming step for forming an adhesive layer on a supporting layer; a resin layer forming step for forming a resin layer on the adhesive layer; a heat generation layer forming step for forming a heat generation layer, which comprises a dye layer containing a near-infrared absorbing dye on the resin layer; and a pigment dispersion layer forming step for forming a pigment dispersion layer, which contains a light-accumulating pigment on the heat generation layer.

9 Claims, 4 Drawing Sheets

(51) Int. Cl.
*B32B 27/18* (2006.01)
*B44C 1/17* (2006.01)
*B41M 5/025* (2006.01)

(56) References Cited

FOREIGN PATENT DOCUMENTS

| | | |
|---|---|---|
| JP | 2002-116721 A | 4/2002 |
| JP | 2003-312196 A | 11/2003 |
| JP | 2006-152242 A | 6/2006 |
| JP | 2008-175844 A | 4/2008 |
| JP | 2011-195792 A | 10/2011 |
| JP | 2013-196165 A | 9/2013 |
| JP | 5729698 B | 6/2015 |

METHOD FOR PRODUCING LIGHT-ACCUMULATING TRANSFER SHEET, LIGHT-ACCUMULATING TRANSFER SHEET AND TRANSFER METHOD FOR LIGHT-ACCUMULATING TRANSFER SHEET

CROSS REFERENCE TO RELATED APPLICATIONS

This application is the National Stage of PCT/JP2017/008744 filed on Mar. 6, 2017, which claims priority under 35 U.S.C. § 119 of Japanese Application No. 2016-094501 filed on May 10, 2016, the disclosures of which are incorporated by reference. The international application under PCT article 21(2) was not published in English.

TECHNICAL FIELD

The present invention relates to a method for producing a light-accumulating transfer sheet, a light-accumulating transfer sheet, and a transfer method for the light-accumulating transfer sheet. More specifically, the present invention relates to a method for producing a light-accumulating transfer sheet that is able to emit high-luminance light for an extended period of time, a light-accumulating transfer sheet, and a transfer method for the light-accumulating transfer sheet.

BACKGROUND ART

Conventionally, transfer sheets containing a light-accumulating pigment have been invented for realizing visibility in a dark place (as in Patent Document 1). The transfer sheet described in Patent Document 1 comprises a substrate and a transfer layer that is peelable from the substrate and contains a hot-melt adhesive particle and a light-accumulating pigment.

PRIOR ART DOCUMENT

Patent Document

Patent Document 1: JP 2003-312196 A

SUMMARY OF THE INVENTION

However, in the transfer sheet described in Patent Document 1, emission of light by the light-accumulating pigment is insufficient in intensity and duration.

The present invention is made in consideration of such conventional problem, and the object is to provide a method for producing a light-accumulating transfer sheet that is able to emit high-luminance light for an extended period of time, a light-accumulating transfer sheet, and a transfer method for the light-accumulating transfer sheet.

The method for producing a light-accumulating transfer sheet related to one embodiment of the present invention solving the above problem comprises: an adhesive layer forming step for forming an adhesive layer on a supporting layer; a resin layer forming step for forming a resin layer on the adhesive layer; a heat generation layer forming step for forming a heat generation layer comprising a dye layer containing a near-infrared absorbing dye on the resin layer; and a pigment dispersion layer forming step for forming a pigment dispersion layer containing a light-accumulating pigment on the heat generation layer.

Also, the light-accumulating transfer sheet related to one embodiment of the present invention solving the above problem is a light-accumulating transfer sheet containing a light-accumulating pigment, comprising a supporting layer, an adhesive layer formed on the supporting layer, a resin layer formed on the adhesive layer, a heat generation layer comprising a dye layer containing a near-infrared absorbing dye formed on the resin layer, and a pigment dispersion layer containing a light-accumulating pigment and formed on the heat generation layer.

Also, the transfer method for the light-accumulating transfer sheet for inkjet printing related to one embodiment of the present invention solving the above problem is a transfer method for the light-accumulating transfer sheet containing a light-accumulating pigment, comprising: an image forming step for forming an inkjet image on the protection layer of the light-accumulating transfer sheet by the inkjet recording method; a supporting layer peeling step for pushing an adhesive peelable film on the inkjet image to cover the inkjet image, and then peeling the supporting layer to expose the adhesive layer; and a transfer step for pressing the exposed adhesive layer on a transfer receiving object, and then transferring the inkjet image on the receiving object by peeling the adhesive peelable film.

EMBODIMENT FOR CARRYING OUT THE INVENTION

<Method for Producing a Light-Accumulating Transfer Sheet>

A method for producing a light-accumulating transfer sheet of one embodiment of the present invention (hereinafter, also referred to as a method for producing a transfer sheet) is explained with reference to the figures. The method for producing a transfer sheet of the embodiment mainly comprises an adhesive layer forming step, a resin layer forming step, a heat generation layer forming step, and a pigment dispersion layer forming step. In the following, each of the steps are explained.

(Adhesive Layer Forming Step)

Figure 1:
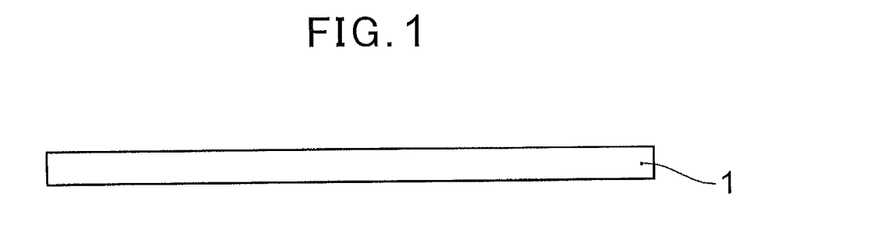
FIG. 1 is a schematic side view of a supporting layer used in the method for producing a transfer sheet of one embodiment of the present invention.
Figure 2:
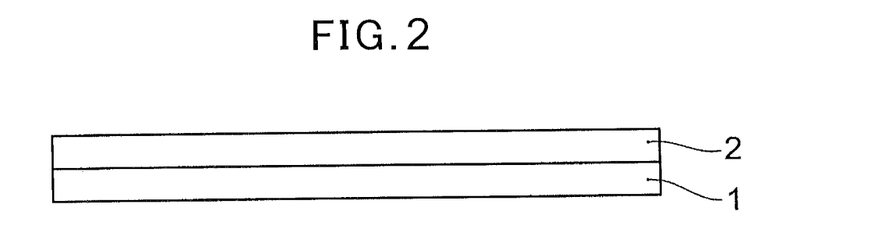
FIG. 2 is a schematic side view of the supporting layer with an adhesive layer formed thereon in the method for producing a transfer sheet of one embodiment of the present invention.

An adhesive layer forming step is a step for forming an adhesive layer on a supporting layer. FIG. 1 is a schematic side view of a supporting layer 1 used in the method for producing a transfer sheet of the embodiment. FIG. 2 is a schematic side view of the supporting layer 1 with an adhesive layer 2 formed thereon in the method for producing a transfer sheet of the embodiment.

Supporting Layer 1

The material of the supporting layer 1 is not particularly limited. Examples of the supporting layer 1 include resin sheets, papers, cloths, rubber sheets, foamed body sheets, metal foils, and the like. Examples of the resin sheets include polyolefin resin sheets such as polyethylene (PE), polypropylene (PP), and ethylene-propylene copolymer; polyester-based resin sheets such as polyethylene terephthalate (PET), polybutylene terephthalate (PBT), and polyethylene naphthalate (PEN); vinyl chloride resin sheets; vinyl acetate resin sheets; polyimide resin sheets; polyamide resin sheets; fluoric resin sheets; cellophanes, and the like. Examples of the papers include Japanese papers, craft papers, glassines, woodfree uncoated papers, synthetic papers, top coated papers, and the like. Examples of the cloths include woven fabrics and nonwoven fabrics made by spinning one or mixed fibrous materials. Examples of the rubber sheets include natural rubber sheets, and butyl rubber sheets, and the like. Examples of the foamed body sheets include foamed polyolefin sheets such as foamed PE sheet, foamed polyester sheet, foamed polyurethane sheet, foamed polychloroprene rubber sheet, and the like. Examples of the metal foils include aluminum foil, copper foil, and the like. Among those, the supporting layer 1 is preferably polyethylene terephthalate (PET) for the reasons of physical characteristics (such as dimensional stability, thickness precision, workability, and tensile strength), economical efficiency (cost), and the like.

The thickness of the supporting layer 1 is not particularly limited. For example, the thickness of the supporting layer 1 is about 25-100 μm.

Adhesive Layer 2

The adhesive layer 2 is made of a resin having adhesiveness. In the embodiment, the adhesive layer 2 may be a resin having adhesiveness at normal temperature or a hot-melt resin having adhesiveness when heated.

Examples of the resin having adhesiveness at normal temperature include acrylic resins, urethane resins, silicone resins, and the like. Examples of the hot-melt resin include urethane resins, polyamide resins, olefin resins, polyester resins, and the like.

Examples of the urethane resins include thermoplastic urethane resins, which are obtained by reaction between a diisocyanate component and a diol component, and the like. Examples of the diisocyanate component include aromatic diisocyanate, aliphatic-aromatic diisocyanate, alicyclic diisocyanate, aliphatic diisocyanate, and the like. Examples of the diol component include low-molecular-weight diols such as aliphatic diol, alicyclic diol, and aromatic diol as well as polyether diol, polyester diol, polycarbonate diol, and the like. Examples of the urethane resins include urethane resins such as polyester-type urethane resin, polycarbonate-type urethane resin, and polyether-type urethane resin; polyurethane urea resin, and the like.

Examples of the polyamide resins include polyamide 6, polyamide 46, polyamide 66, polyamide 610, polyamide 612, polyamide 11, polyamide 12, polyamide resins produced by reaction between a dimer acid and a diamine, polyamide elastomers, and the like.

Examples of the olefin resins include a homopolymer or a copolymer of α-olefins (particularly, α-C2-10 olefin) such as ethylene, propylene, 1-butene, 3-methyl-1-pentene, 4-methyl-1-butene, 1-hexene, and 1-octene; olefin elastomers; and the like.

Examples of the polyester resins include homopolyester resins or copolyester resins with at least aliphatic diol or aliphatic dicarboxylic acid; polyester elastomers; and the like.

The softening point of the hot-melt resin is about 70-180° C. Also, the melting point of the hot-melt resin is about 50-250° C.

When fabric such as clothes is used as a transfer receiving object, the hot-melt resin is, among those described above, preferably an urethane resin, an olefin resin, and the like, in view of adhesiveness such as interlayer adhesion, softness, and texture.

The thickness of the adhesive layer 2 is not particularly limited. For example, the thickness of the adhesive layer 2 is about 20-100 μm. For example, when pushed against a transfer receiving object, the adhesive layer 2 having such thickness is less likely to extend beyond the edge. Also, such adhesive layer 2 is likely to provide weather resistance to the resulting transfer sheet.

The method for forming the adhesive layer 2 on the supporting layer 1 is not particularly limited. For example, the adhesive layer 2 can be formed on the supporting layer 1 by means of general-purpose printing methods such as a heliogravure method and a screen-printing method, a roll coater method, or the like.

(Resin Layer Forming Step)

Figure 3:
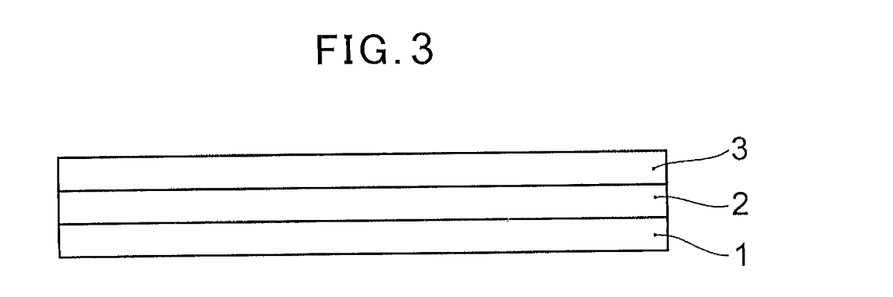
FIG. 3 is a schematic side view of the adhesive layer with a resin layer formed thereon in the method for producing a transfer sheet of one embodiment of the present invention.

The resin layer forming step is a step for forming a resin layer on the adhesive layer 2. FIG. 3 is a schematic side view of the adhesive layer 2 with a resin layer 3 formed thereon in the method for producing a transfer sheet of the embodiment.

Resin Layer 3

The resin constituting the resin layer 3 is not particularly limited. Examples of the resin constituting the resin layer 3 include acrylic resins, cellulosic resins, polyester resins, vinyl resins, polyurethane resins, polycarbonate resins, or partly crosslinking resins of those, and the like. Among those, the resin layer 3 is preferably made of polyester for its excellent softness and handling property.

The thickness of the resin layer 3 is not particularly limited. For example, the thickness of the resin layer 3 is about 10-40 μm. When a transfer sheet with the resin layer 3 having such thickness is transferred to a transfer receiving object, the color of the transfer receiving object is likely to be hidden; therefore, the image, such as an inkjet image, transferred by the transfer sheet is likely to be expressed clearly.

Also, the degree of light transmittance of the resin layer 3 is not particularly limited. For example, pigment is dispersed in the resin layer 3 to lower the light transmittance. Examples of such pigment include white pigments and the like.

Examples of the white pigments include titanium oxide, zinc oxide, as well as inorganic fillers such as silica, alumina, clay, talc, calcium carbonate or barium sulfate; and resin particles (plastic pigments) of acryl resins, epoxy resins, polyurethane resins, phenol resins, melamine resins, benzoguanamine resins, fluororesins, or silicone resins. When the resin layer 3 contains a pigment (for example, a white pigment), the method for producing a transfer sheet of the embodiment can form a clearer image in a process of forming an inkjet image as will be described below.

When pigment is dispersed in the resin layer 3, the mixing ratio between the resin and the pigment is, for example, about 1:1 to 1:10.

The method for forming the resin layer 3 is not particularly limited. For example, the resin layer 3 can be formed on the adhesive layer 2 by means of general-purpose printing methods such as a heliogravure method and a screen-printing method, a roll coater method, or the like.

(Heat Generation Layer Forming Step)

Figure 4:
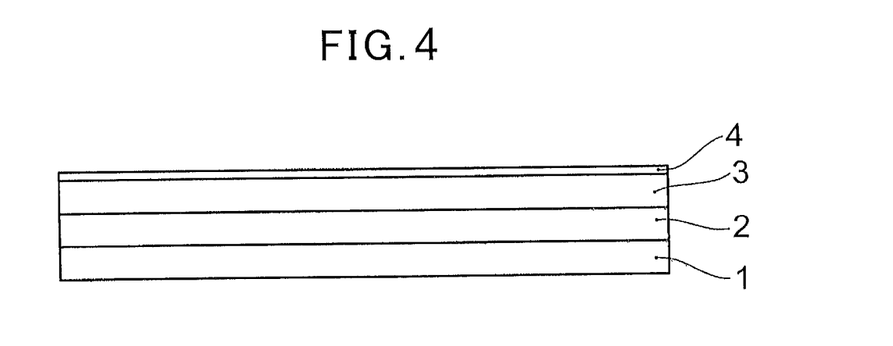
FIG. 4 is a schematic side view of the resin layer with a heat generation layer (a dye layer) formed thereon in the method for producing a transfer sheet of one embodiment of the present invention.

The heat generation layer forming step is a step for forming a heat generation layer comprising a dye layer containing a near-infrared absorbing dye on the resin layer 3. FIG. 4 is a schematic side view of the resin layer 3 with the dye layer 4 formed thereon in the method for producing a transfer sheet of the embodiment.

Dye Layer 4

The dye layer 4 contains a near-infrared absorbing dye and formed on the resin layer 3. A near-infrared absorbing dye is a dye having an absorption maximum in the near-infrared range of the wavelength of 800-1200 nm, and examples thereof include compounds such as diimmoniumu salt compounds, phthalocyanine compounds, dithiol metal complex compounds, naphthalocyanine compounds, azo compounds, polymethine-based dye compounds, anthraquinone compounds, naphthoquinone compounds, pyrylium compounds, thiopyrylium compounds, squalirium compounds, croconium compounds, tetradehydrocholine compounds, triphenyl methane compounds, cyanine compouds, azo compounds, aminiumum compounds.

The near-infrared absorbing dye is dispersed or dissolved in resin for forming a layer on the resin layer 3. The resin in which the near-infrared absorbing dye is dispersed or dissolved is not particularly limited. Examples of such resin include polyester resins, acrylic resins, polyamide resins, polyurethane resins, polyolefin resins, and polycarbonate resins. Among those resins, acrylic resins are preferable for their excellent transparency when mixed with a dye, heat resistance, and solvent resistance.

The content of the near-infrared absorbing dye in the dye layer 4 is not particularly limited. For example, the near-infrared absorbing dye is preferably not less than 5% by mass of the resin, more preferably not less than 10% by mass. Also, the near-infrared absorbing dye is preferably not more than 20% by mass of the resin, more preferably not more than 15% by mass. When the content of the near-infrared absorbing dye is below 5% by mass, there is a tendency that a light-accumulating pigment as will be described later cannot be heated sufficiently. On the other hand, the content of the near-infrared absorbing dye is above 20% by mass, the light-accumulating pigment is likely to be overheated.

Also, the near-infrared absorbing dye may be suitably dispersed in an organic solvent instead of the above resins. Examples of such organic solvent include alcohols such as methanol, ethanol, n-propyl alcohol, isopropyl alcohol, n-butylalcohol, tridecyl alcohol, cyclohexanol, and 2-methylcyclohexanol; glycols such as ethylene glycol, diethylene glycol, triethylene glycol, polyethylene glycol, propylene glycol, and dipropylene glycol, and glycerin; glycol ethers such as ethylene glycol monomethyl ether, ethylene glycol monoethylene ether, ethylene glycol monobutyl ether, diethylene glycol monomethyl ether, diethylene glycol monoethyl ether, diethylene glycol butyl ether, ethylene glycol monomethyl ether acetate, ethylene glycol monoethyl acetate, diethylene glycol monobutyl acetate, diethylene glycol monomethyl acetate, diethylene glycol monoethyl acetate, diethylene glycol monobutyl acetate; esters such as ethyl acetate, Isopropyl acetate, and n-Butyl acetate; ketones such as acetone, ethyl methyl ketone, methyl isobutyl ketone, cyclohexanone, cyclopentanone, isophorone, and diacetone alcohol.

The thickness of the dye layer 4 is not particularly limited. For example, the thickness of the dye layer 4 is about 5-30 μm. The dye layer 4 having such thickness is likely to be suitably heated by exposure to sunlight or the like.

The method for forming the dye layer 4 is not particularly limited. For example, the dye layer 4 can be formed on the resin layer by means of general-purpose printing methods such as a heliogravure method and a screen-printing method, a roll coater method, or the like.

In the embodiment, when the dye layer 4 is exposed to sunlight for about 30 minutes, for example, at a surrounding temperature of 20° C., heat is generated by an effect of photothermal conversion, and the temperature of the dye layer 4 becomes about 2-20° C. higher than the surroundings. Also, in such situation, heat generation of the dye layer 4 continues for about 5 to 30 minutes. By such heat, a light-accumulating pigment in a pigment dispersion layer as described below is heated for an extended period of time and thus continuously emit light excellently. It should be noted that as the dye layer 4 is continuously exposed to sunlight or the like, it can remain in a heated state. Also, a light source to which the dye layer 4 is exposed is not limited to sunlight and may be a fluorescent lamp, an LED light source, a black light, or the like.

(Pigment Dispersion Layer Forming Step)

Figure 5:
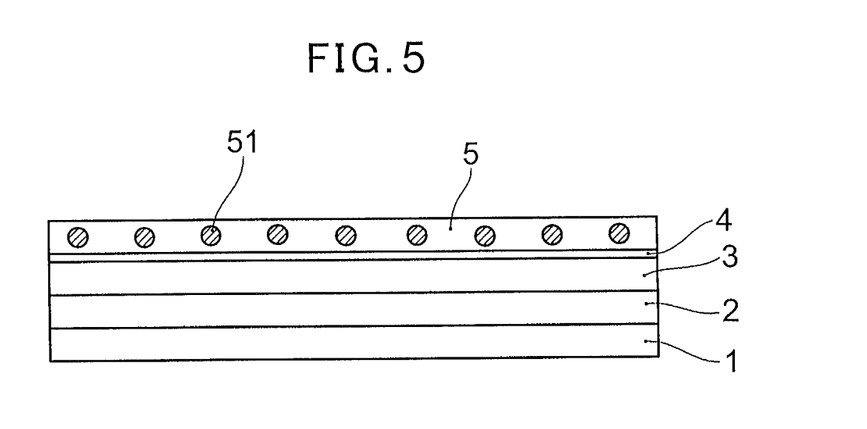
FIG. 5 is a schematic side view of the heat generation layer with a pigment dispersion layer formed thereon in the method for producing a transfer sheet of one embodiment of the present invention.

The pigment dispersion layer forming step is a step for forming a pigment dispersion layer containing a light-accumulating pigment on the heat generation layer. FIG. 5 is a schematic side view of the heat generation layer with a pigment dispersion layer 5 formed thereon in the method for producing a transfer sheet of the embodiment.

Light-Accumulating Pigment 51

The light-accumulating pigment 51 is a pigment which absorbs light energy, keep it temporarily, and then gradually radiate the energy in the form of phosphorescence. The light-accumulating pigment 51 is not particularly limited. Examples of the light-accumulating pigment 51 include sulfide fluorescent substances such as potassium sulfide, zinc sulfide, and zinc sulfide cadmium; and an aluminate fluorescent substance comprising strontium, europium, and dysprosium. Regarding the aluminate fluorescent, in the compounds represented by $MAl_2O_4$, the M comprises a compound comprising at least one metallic element selected from a group consisting of calcium, strontium, barium as a matrix crystal and suitably comprises an augmenting agent such as europium, cerium, praseodymium, neodymium, samarium, terbium, dysprosium, holmium, erbium, thulium, ytterbium, and lutetium.

In the embodiment, the light-accumulating pigment 51 preferably contains strontium, more preferably contains strontium aluminate as the main component with an augmenting agent such as europium and dysprosium added thereto because they are able to emit high-luminance light for an extended period of time. Such light-accumulating pigment 51 is specifically exemplified by $SrAl_2O_4$: Eu, Dy; $Sr_4Al_{14}O_{25}$: Eu, Dy; and the like.

Also, the light-accumulating pigment 51 may be coated by amorphous silica on the surface as the light-accumulating pigment described in, for example, JP 5729698 B. It should be noted that the light-accumulating pigment described in JP 5729698 B is one example of the light-accumulating pigment used most preferably in the embodiment.

The mean particle size of the light-accumulating pigment 51 is preferably not less than 10 μm, more preferably not less than 45 μm. Also, the mean particle size of the light-accumulating pigment 51 is preferably not more than 100 μm. When the light-accumulating pigment 51 has a mean particle size of less than 10 μm, it is not likely to emit sufficient light. On the other hand, when the light-accumulating pigment 51 has a mean particle size of more than 100 μm, it is likely to have a degraded handling property. It should be noted that the mean particle size of the light-accumulating pigment 51 is a 50% mean particle size (D50) which can be calculated based on the measurement using, for example, SLD-3100 (manufactured by Shimadzu Corporation).

Also, the intensity of the light emitted by the light-accumulating pigment 51 depends on the temperature. Specifically, the light-accumulating pigment 51 emits more intense light at a higher temperature (e.g., about 200° C.). However, when the transfer receiving object is clothes or the like, heating it to such high temperature is not appropriate. As described above, for example, when exposed to sunlight for about 30 minutes in a condition at the temperature of 20-23° C., the near-infrared pigment in the dye layer 4 generates heat and the temperature increases by about 2-20° C. Therefore, the dye layer 4 keeps heating the light-accumulating pigment 51 so that it continuously emits suitable light. Also, the pigment dispersion layer 5 keeps emitting light by being exposed to other light sources (such as a fluorescent light) than sunlight. Thus, as the light-accumulating pigment 51 is continuously heated, it can emit light with high luminance for an extended period of time. In the method for producing a transfer sheet of the embodiment, the light-accumulating pigment 51 in the pigment dispersion layer 5 is heated by the above-mentioned heat generation layer; therefore, it can emit more intense and longer light compared to conventional techniques where the heat generation layer is not formed.

The light-accumulating pigment 51 is dispersed or dissolved in resin for forming a layer on the heat generation layer. The resin in which the light-accumulating pigment 51 is dispersed or dissolved is not particularly limited. Examples of such resin include polyester resins, acrylic resins, polyamide resins, polyurethane resins, epoxy resins, polyolefin resins, and polycarbonate resins. Among those, polyester resins, epoxy resins, or polycarbonate resins are preferable for their high transparency.

The content of the light-accumulating pigment 51 in the pigment dispersion layer 5 is not particularly limited. For example, the light-accumulating pigment 51 is preferably not less than 10% by mass in the resin. Also, the light-accumulating pigment 51 is preferably not more than 50% by mass in the resin. When the content of the light-accumulating pigment 51 is less than 10% by mass, a sufficient emission of light is less likely to be achieved. On the other hand, when the content of the light-accumulating pigment 51 is more than 50% by mass, the light-accumulating pigment 51 is less likely to be dissolved in the resin.

The thickness of the pigment dispersion layer 5 is not particularly limited. For example, the thickness of the pigment dispersion layer 5 is about 50-200 μm. The pigment dispersion layer 5 having such thickness has the advantage that heat tends to be transferred from the heat generation layer to the light-accumulating pigment 51 sufficiently, and thereby the light-accumulating pigment 51 is more likely to emit light.

According to the method for producing a light-accumulating transfer sheet including the above steps, a light-accumulating transfer sheet is produced, wherein the light-accumulating transfer sheet comprises the supporting layer 1; the adhesive layer 2 formed on the supporting layer 1; the resin layer 3 formed on the adhesive layer 2; the heat generation layer formed on the resin layer 3 and containing the dye layer 4 containing the near-infrared absorbing dye; the pigment dispersion layer 5 containing the light-accumulating pigment 51 and formed on the heat generation layer. According to the above method for producing a light-accumulating transfer sheet and the light-accumulating transfer sheet to be obtained, the heat generation layer generates heat by an effect of photothermal conversion of the near-infrared absorbing dye and the temperature becomes about 2-20° C. higher than the surroundings. Thus the light-accumulating pigment 51 is heated. Consequently, the light-accumulating pigment 51 is likely to emit light with high luminance. Also, by the heat generated by the heat generation layer, the light-accumulating pigment 51 is likely to remain in a heated state. Consequently, the light-accumulating pigment 51 is likely to continuously emit light for an extended period of time.

More specifically, for example, the light-accumulating pigment descried in JP 5729698 B is provided as the light-accumulating pigment 51 to cover 90% of the resin layer 3 seen from a top view, and when that is exposed to sunlight for 20 minutes, it can emit light in 5 mcd/m² or higher even eight hours after the process of exposure.

Figure 6:
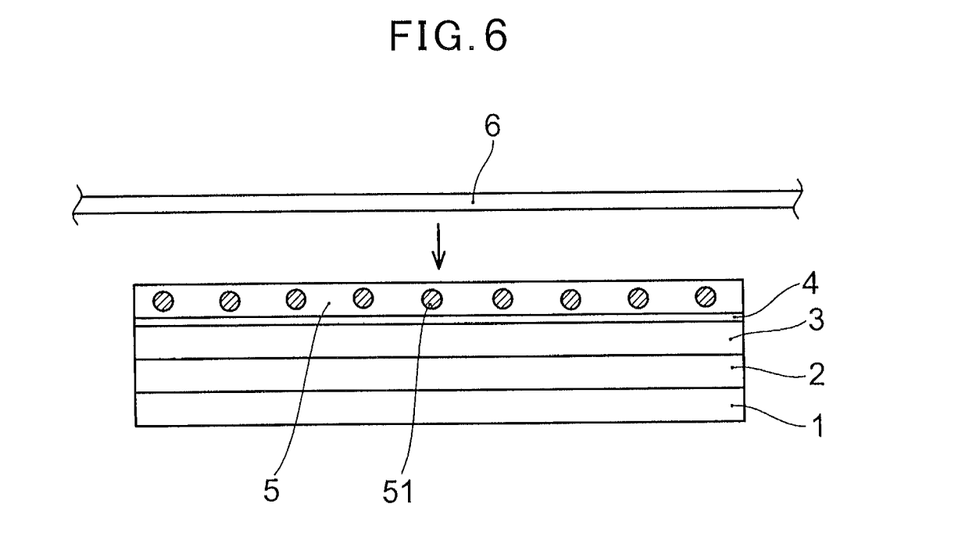
FIG. 6 is a schematic side view of an adhesive peelable film being applied to the pigment dispersion layer of the transfer sheet in the method for producing a transfer sheet of one embodiment of the present invention.
Figure 7:
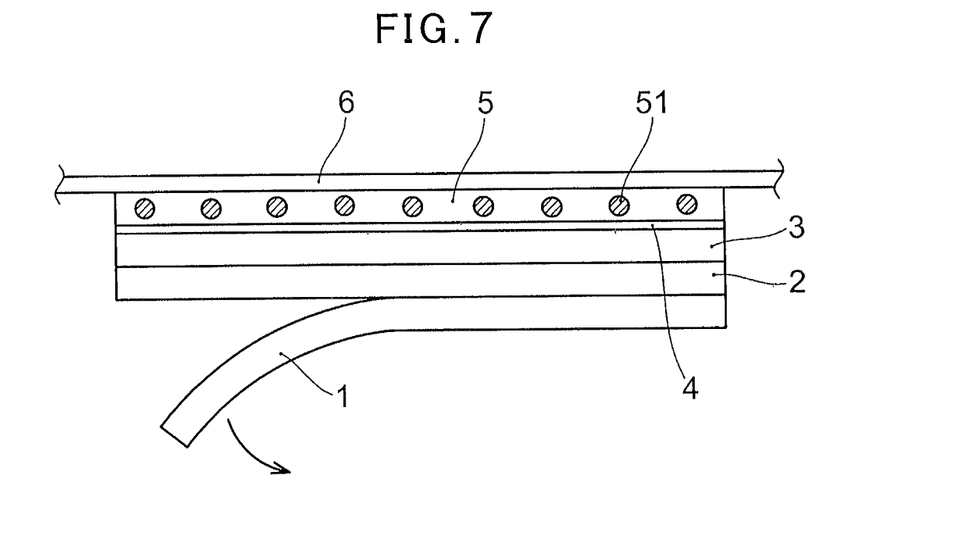
FIG. 7 is a schematic side view for illustrating a supporting layer being peeled in the method for producing a transfer sheet of one embodiment of the present invention.

In the light-accumulating transfer sheet obtained by the method for producing a light-accumulating transfer sheet, an adhesive peelable film (a tack film) is pushed against the sheet, and it is peeled together with the supporting layer 1 so that the adhesive layer 2 can be exposed. FIG. 6 is a schematic side view of an adhesive peelable film 6 being applied to the pigment dispersion layer 5 in the method for producing a transfer sheet of the embodiment transfer sheet. FIG. 7 is a schematic side view for illustrating the supporting layer being peeled in the method for producing a transfer sheet of the embodiment.

In the transfer sheet obtained by the method for producing a transfer sheet of the embodiment, the adhesive layer 2, which has been exposed by peeling the supporting layer, is pressed (or heat transfer printed) against a transfer receiving object, and then the adhesive peelable film 6 is peeled so that transfer printing is made on the transfer receiving object.

The transfer receiving object is not particularly limited. Examples of the transfer receiving object include a two-dimensional or three-dimensional structure made of any of various materials such as fibers, papers, woods, plastics, ceramics, and metals.

<Variation (The First Variation) of the Present Embodiment>

In the method for producing a transfer sheet of the above embodiment, as shown in FIG. 6, an example where the adhesive peelable film 6 is pressed against the pigment dispersion layer 5 is shown. Alternatively, a method for producing a transfer sheet of the present embodiment (the first variation) can further comprise a protection layer forming step.

(Protection Layer Forming Step)

Figure 8:
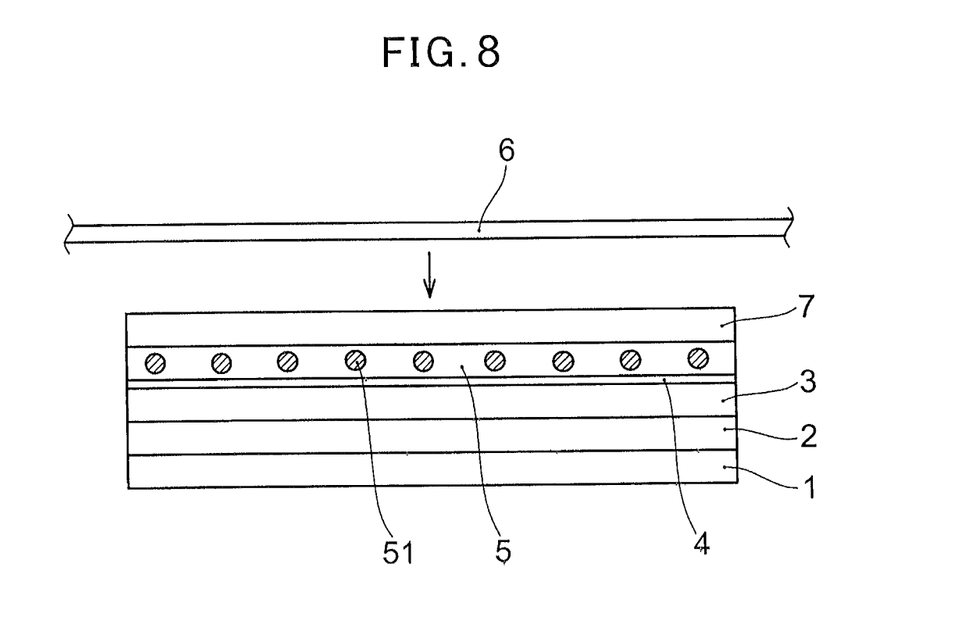
FIG. 8 is a schematic side view of the pigment dispersion layer with a protection layer formed thereon in the method for producing a transfer sheet of one embodiment of the present invention (the first variation).

The protection layer forming step is a step for forming a protection layer on the pigment dispersion layer 5. It should be noted that a protection layer 7 is provided mainly for the purpose of providing weather resistance to the transfer sheet. Also, the protection layer 7 serves as an ink receiving layer when an inkjet image is formed thereon. FIG. 8 is a schematic side view of the pigment dispersion layer with the protection layer 7 formed thereon in the method for producing a transfer sheet of the embodiment. The protection layer 7 is not particularly limited. For example, the protection layer 7 may be a so-called resin-based ink receiving layer, which consists mainly of a hydrophilic binder or may be a pigment-based ink receiving layer, which has gaps made by the pigment in the recording layer.

The resin-based receiving layer is formed by applying and then drying a solution of a water soluble resin such as a polyvinyl alcohol, a polyvinyl pyrrolidone, a water-soluble cellulose derivative, and a gelatin. The resin-based receiving layer is highly transparent and glossy.

The thickness of the protection layer 7 is not particularly limited. For example, the thickness of the protection layer 7 is about 50-150 μm. The protection layer 7 having such thickness is excellent in weather resistance, and an image is easily formed on the protection layer 7.

On the protection layer 7, an inkjet image is formed by the method for inkjet recording as described below. Also, the protection layer 7 with an inkjet image formed thereon can transfer the inkjet image on a transfer receiving object by pushing the adhesive peelable film 6 (a retack film) against the protection layer 7, peeling the supporting layer 1 to expose the adhesive layer 2, and then pressing (or heat transfer printing) the adhesive layer 2 against the transfer receiving object, as mentioned above. The light-accumulating pigment 51 in the transferred inkjet image can effectively emit light and provides excellent visibility even in a dark place. Therefore, the transfer sheet obtained in the embodiment can be suitably applied to uses aimed for decorative effect especially in a dark place, equipment related to traffic safety for calling for drivers' and pedestrians' attention, and equipment used in factories, construction sites, and the like. Also, such transfer sheet can be used for emphasizing a display medium when transferred in accordance with the shapes of letters, symbols, figures, and the like. In addition, the transfer sheet can transfer a leading sign to a corridor, stairs, and the like. Moreover, when the transfer sheet is transferred to a cover of lighting equipment or a light source, it can be applied as a kind of emergency light.

<Variation (The Second Variation) of the Present Embodiment>

In the method for producing a transfer sheet the above embodiment, an example where the dye layer 4 is formed on the resin layer 3 is shown, as shown in FIG. 6. Alternatively, the method for producing a transfer sheet of the present embodiment (the second variation) may further comprise a latent heat storage agent layer forming step.

(Latent Heat Storage Agent Layer Forming Step)

Figure 9:
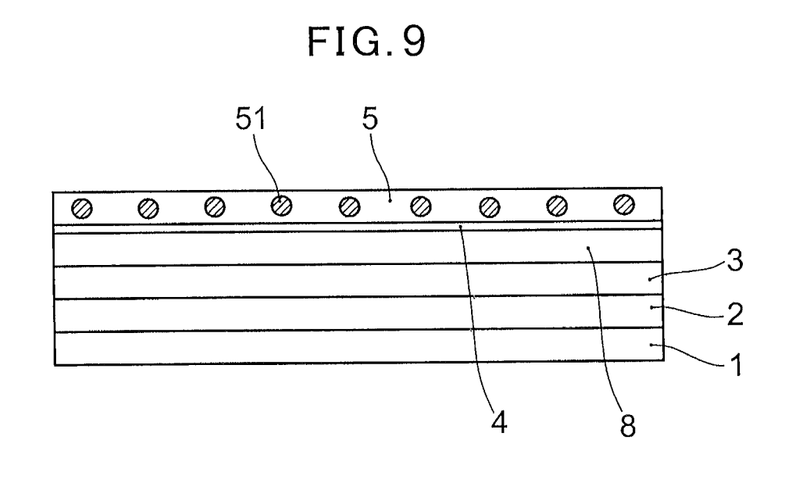
FIG. 9 is a schematic side view of the resin layer with a dye layer and a latent heat storage agent layer formed thereon as a heat generation layer in the method for producing a transfer sheet of one embodiment of the present invention (the second variation).

The latent heat storage agent forming step is a step for forming a latent heat storage agent layer comprising a latent heat storage agent on the dye layer 4. FIG. 9 is a schematic side view of the resin layer 3 with the dye layer 4 and a latent heat storage agent layer 8 formed thereon as the heat generation layer in the method for producing a transfer sheet of the embodiment.

Latent Heat Storage Agent Layer 8

The latent heat storage agent layer 8 is a layer comprising latent heat storage agent. The latent heat storage agent is not particularly limited. Examples of the latent heat storage agent include n-paraffins comprising n-octadecane or n-hexadecane as the main component, inorganic hydrated salts (such as calcium chloride hexahydrate and sodium sulfate decahydrate), fatty acids (such as palmitic acid and myristic acid), aromatic hydrocarbon compounds (such as benzine and p-xylene), ester compounds (such as isopropyl palmitate and butyl stearate), alcohols (such as stearyl alcohol), polyalkylene glycol, and the like. Among those, the latent heat storage agent is preferably a paraffin because it is low in price and easy to obtain.

The latent heat storage agent is dispersed of dissolved in resin for forming a layer on the dye layer 4. The resin in which the latent heat storage agent is dispersed and dissolved is not particularly limited. Examples of such resin include polyester resins, acrylic resins, polyamide resins, polyurethane resins, epoxy resins, polyolefin resins, polycarbonate resins, and the like. Among those, the resin is preferably a polyester resin, an epoxy resin, or a polycarbonate resin because they are highly transparent.

The thickness of the latent heat storage agent layer 8 is not particularly limited. For example, the thickness of the latent heat storage agent layer 8 is about 10-50 μm. The latent heat storage agent layer 8 having such thickness is able to suitably store heat and likely to increase the intensity of light emitted by the light-accumulating pigment 51.

When the latent heat storage agent is dispersed in the resin, the mixing ratio between the resin and the latent heat storage agent is, for example, about 3:10 to 5:10.

The method for forming the latent heat storage agent layer 8 is not particularly limited. For example, the latent heat storage agent layer 8 can be formed on the dye layer 4 by means of general-purpose printing methods such as a heliogravure method and a screen-printing method, a roll coater method, or the like.

According to the transfer sheet provided with the latent heat storage agent layer 8, the light-accumulating pigment 51 is suitably heated. Consequently, the light-accumulating pigment 51 is likely to emit light with high luminance. Also, the light-accumulating pigment 51 is likely to remain in a heated state by the heat generated by the heat generation layer. Consequently, the light-accumulating pigment 51 is likely to continuously emit light for an extended period of time.

<Variation (The Third Variation) of the Present Embodiment>

In the method for producing a transfer sheet of the above embodiment (the second variation), an example where the latent heat storage agent layer 8 is formed on the dye layer 4, as shown in FIG. 9. Alternatively, in a method for producing a transfer sheet of the present embodiment (the third variation), the latent heat storage agent can be mixed in the resin layer 3. Thus the light-accumulating pigment 51 is heated by the latent heat storage agent in the resin layer 3 via the heat generation layer formed on the resin layer 3. Consequently, the light-accumulating pigment 51 is likely to emit light with high luminance. Also, the light-accumulating pigment 51 is likely to remain in a heated state by the heat generated by the heat generation layer. Consequently, the light-accumulating pigment 51 is likely to continuously emit light for an extended period of time.

When the latent heat storage agent is mixed in the resin layer 3, the mixing amount is not particularly limited. For example, relative to 100 parts by mass of the resin, 30-50 parts by mass of the latent heat storage agent is mixed.

<Transfer Method for the Light-Accumulating Transfer Sheet>

A transfer method for the light-accumulating transfer sheet of one embodiment of the present invention (which is also referred to as a transfer method, hereinafter) is a method in which the protection layer 7 and an inkjet image are formed on the light-accumulating transfer sheet manufactured in the above embodiment and subsequently the transfer sheet is transferred on a transfer receiving object. Specifically, the transfer method for the present embodiment mainly comprises an image forming step, a supporting layer peeling step, and a transfer step.

(Image Forming Step)

The image forming step is a step for forming an inkjet image by the inkjet recording method on the protection layer 7 of the light-accumulating transfer sheet as described above. The conditions for the inkjet recording method (printing conditions) are not particularly limited. The printing conditions such as a nozzle diameter of an inkjet printer, an applied voltage, a pulse width, a drive frequency, a resolution, an amount of ink to be supplied are suitably selected for forming a desired inkjet image on the protection layer 7.

(Supporting Layer Peeling Step)

The supporting layer peeling step is a step for pushing the adhesive peelable film 6 (a retack film) on an inkjet image to cover the inkjet image, and then peeling the supporting layer 1 to expose the adhesive layer 2. Specifically, in this step, the adhesive peelable film 6 is pushed against an inkjet image.

(Transfer Step)

The transfer step is a step for pressing the exposed adhesive layer 2 on a transfer receiving object, and then transferring the inkjet image on the receiving object by peeling the adhesive peelable film 6. The transfer receiving object is not particularly limited. For example, the transfer receiving object is a two-dimensional or three-dimensional structure made of any of various materials such as fibers, papers, woods, plastics, ceramics, and metals.

According to the transfer method for the present embodiment, the transfer sheet comprising the light-accumulating pigment 51 is used. Also, the heat generation layer generates heat by an effect of photothermal conversion of the near-infrared absorbing dye and the temperature becomes about 20-30° C. higher than the surroundings. Thus the light-accumulating pigment 51 is heated. Therefore, the light-accumulating pigment 51 in an inkjet image to be transferred effectively emits light and provides excellent visibility even in a dark place for an extended period of time. Therefore, the transfer method for the present embodiment can be suitably applied to uses aimed for decorative effect especially in a dark place, equipment related to traffic safety for calling for drivers' and pedestrians' attention, and equipment used in factories, construction sites, and the like. Also, the transfer method can also applied to paper for Fusuma (a Japanese sliding door) and wallpaper in addition to those described above. Moreover, according to the transfer method, an emphasizing effect of a display medium can be obtained when transferring is performed in accordance with the shapes of letters, symbols, figures, and the like. In addition, the transfer method allows a transfer sheet to be transferred to a corridor, stairs, and the like as a leading sign. Furthermore, the transfer method allows a transfer sheet to be applied as a kind of emergency light by transferring the transfer sheet to a cover of lighting equipment or a light source.

So far, one embodiment of the present invention has been explained. The present invention is not limited to the above embodiment. It should be noted that the above embodiment is one embodiment of the invention having the following configuration.

(1) A method for producing a light-accumulating transfer sheet, comprising: an adhesive layer forming step for forming an adhesive layer on a supporting layer; a resin layer forming step for forming a resin layer on the adhesive layer; a heat generation layer forming step for forming a heat generation layer comprising a dye layer containing a near-infrared absorbing dye on the resin layer; and a pigment dispersion layer forming step for forming a pigment dispersion layer containing a light-accumulating pigment on the heat generation layer.

According to this configuration, the heat generation layer generates heat by an effect of photothermal conversion of the near-infrared absorbing dye and the temperature becomes about 20-30° C. higher than the surroundings. Thus the light-accumulating pigment is heated. Consequently, the light-accumulating pigment is likely to emit light with high luminance. Also, the light-accumulating pigment is likely to remain in a heated state by the heat generated by the heat generation layer. Consequently, the light-accumulating pigment is likely to continuously emit light for an extended period of time.

(2) The method for producing a light-accumulating transfer sheet of (1), comprising a protection layer forming step for forming a protection layer on the pigment dispersion layer.

According to this configuration, when an inkjet image is formed on, for example, the protection layer, the inkjet image formed thereon emits a bright light with high luminance for an extended period of time.

(3) The method for producing a light-accumulating transfer sheet of (1) or (2), wherein the heat generation layer forming step comprises: a dye layer forming step for forming a dye layer containing a near-infrared absorbing dye is formed; and a latent heat storage agent layer forming step for forming a latent heat storage agent layer containing a latent heat storage agent on the dye layer.

According to this configuration, the light-accumulating pigment is heated by the near-infrared absorbing dye and, in addition, by the latent heat storage agent. Consequently, the light-accumulating pigment is likely to emit light with higher luminance. Also, by the heat generated by the heat generation layer, the light-accumulating pigment is likely to remain in a heated state for a longer period of time. Consequently, the light-accumulating pigment is likely to emit light for a longer period of time.

(4) The method for producing a light-accumulating transfer sheet of (1) or (2), wherein the resin layer contains a latent heat storage agent.

According to this configuration, the light-accumulating pigment is heated by the near-infrared absorbing dye and, in addition, by the latent heat storage agent. Consequently, the light-accumulating pigment is likely to emit light with higher luminance. Also, by the heat generated by the heat generation layer, the light-accumulating pigment is likely to remain in a heated state for a longer period of time. Consequently, the light-accumulating pigment is likely to emit light for a longer period of time.

(5) A light-accumulating transfer sheet containing a light-accumulating pigment, comprising a supporting layer, an adhesive layer formed on the supporting layer, a resin layer formed on the adhesive layer, a heat generation layer comprising a dye layer containing a near-infrared absorbing dye and formed on the resin layer, and a pigment dispersion layer containing a light-accumulating pigment and formed on the heat generation layer.

According to this configuration, the heat generation layer generates heat by an effect of photothermal conversion of the near-infrared absorbing dye and the temperature becomes about 20-30° C. higher than the surroundings. Thus the light-accumulating pigment is heated. Consequently, the light-accumulating pigment is likely to emit light with high luminance. Also, by the heat generated by the heat generation layer, the light-accumulating pigment is likely to remain in a heated state. Consequently, the light-accumulating pigment is likely to emit light for an extended period of time.

(6) The light-accumulating transfer sheet of (5), wherein a protection layer is formed on the pigment dispersion layer.

According to this configuration, when an inkjet image is formed on, for example, the protection layer, the inkjet image formed thereon emits a bright light with high luminance for an extended period of time.

(7) The light-accumulating transfer sheet of (5) or (6), wherein the heat generation layer comprises a dye layer containing a near-infrared absorbing dye, and a latent heat storage agent layer containing a latent heat storage agent and formed on the dye layer.

According to this configuration, the light-accumulating pigment is heated by the near-infrared absorbing dye and, in addition, by the latent heat storage agent. Consequently, the light-accumulating pigment is likely to emit light with higher luminance. Also, by the heat generated by the heat generation layer, the light-accumulating pigment is likely to remain in a heated state for a longer period of time. Consequently, the light-accumulating pigment is likely to emit light for a longer period of time.

(8) The light-accumulating transfer sheet of (5) or (6), wherein the resin layer comprises a latent heat storage agent.

According to this configuration, the light-accumulating pigment is heated by the near-infrared absorbing dye and, in addition, by the latent heat storage agent. Consequently, the light-accumulating pigment is likely to emit light with higher luminance. Also, by the heat generated by the heat generation layer, the light-accumulating pigment is likely to remain in a heated state for a longer period of time. Consequently, the light-accumulating pigment is likely to emit light for a longer period of time.

(9) A transfer method for the light-accumulating transfer sheet containing a light-accumulating pigment, comprising: an image forming step for forming an inkjet image on the protection layer of the light-accumulating transfer sheet of (6) by the inkjet recording method; a supporting layer peeling step for pushing an adhesive peelable film on the inkjet image to cover the inkjet image, and then peeling the supporting layer to expose the adhesive layer; a transfer step for pressing the exposed adhesive layer on a transfer receiving object, and then transferring the inkjet image on the receiving object by peeling the adhesive peelable film.

According to this configuration, the heat generation layer generates heat by an effect of photothermal conversion of the near-infrared absorbing dye and the temperature becomes about 20-30° C. higher than the surroundings. Consequently, the light-accumulating pigment is likely to emit light with high luminance. Also, by the heat generated by the heat generation layer, the light-accumulating pigment is likely to remain in a heated state. Consequently, the light-accumulating pigment is likely to emit light for a longer period of time. In addition, the inkjet image formed on the pigment dispersion layer containing such light-accumulating pigment emits a bright light with high luminance for an extended period of time.

REFERENCE SIGN LIST 1 supporting layer
2 adhesive layer
3 resin layer
4 dye layer
5 pigment dispersion layer
51 light-accumulating pigment
6 adhesive peelable film
7 protection layer
8 latent heat storage agent layer

The invention claimed is:

1. A method for producing a light-accumulating transfer sheet, comprising:
    an adhesive layer forming step for forming an adhesive layer on a supporting layer;
    a resin layer forming step for forming a resin layer on the adhesive layer;
    a heat generation layer forming step for forming a heat generation layer comprising a dye layer containing a near-infrared absorbing dye on the resin layer; and
    a pigment dispersion layer forming step for forming a pigment dispersion layer containing a light-accumulating pigment on the heat generation layer.

2. The method for producing a light-accumulating transfer sheet of claim 1, comprising a protection layer forming step for forming a protection layer on the pigment dispersion layer.

3. The method for producing a light-accumulating transfer sheet of claim 1, wherein the heat generation layer forming step comprises:
    a dye layer forming step for forming a dye layer containing a near-infrared absorbing dye; and
    a latent heat storage agent layer forming step for forming a latent heat storage agent layer containing a latent heat storage agent on the dye layer.

4. The method for producing a light-accumulating transfer sheet of claim 1, wherein the resin layer contains a latent heat storage agent.

5. A light-accumulating transfer sheet containing a light-accumulating pigment, comprising a supporting layer, an adhesive layer formed on the supporting layer, a resin layer formed on the adhesive layer, a heat generation layer comprising a dye layer containing a near-infrared absorbing dye formed on the resin layer, and a pigment dispersion layer containing a light-accumulating pigment and formed on the heat generation layer.

6. The light-accumulating transfer sheet of claim 5, wherein a protection layer is formed on the pigment dispersion layer.

7. A transfer method for a light-accumulating transfer sheet containing a light-accumulating pigment, comprising:
    an image forming step for forming an inkjet image on the protection layer of the light-accumulating transfer sheet of claim 6 by the inkjet recording method;
    a supporting layer peeling step for pushing an adhesive peelable film on the inkjet image to cover the inkjet image, and then peeling the supporting layer to expose the adhesive layer;

a transfer step for pressing the exposed adhesive layer on a transfer receiving object, and then transferring the inkjet image on the receiving object by peeling the adhesive peelable film.

8. The light-accumulating transfer sheet of claim 5, wherein the heat generation layer comprises a dye layer containing a near-infrared absorbing dye, and a latent heat storage agent layer containing a latent heat storage agent and formed on the dye layer.

9. The light-accumulating transfer sheet of claim 5, wherein the resin layer comprises a latent heat storage agent.

* * * * *